(12) United States Patent
Turner et al.

(10) Patent No.: US 7,869,352 B1
(45) Date of Patent: *Jan. 11, 2011

(54) ADAPTIVE NETWORK ROUTER

(75) Inventors: Stephen W. Turner, Menlo Park, CA (US); Hsien-Chung Woo, Fremont, CA (US); Sanjay Kalra, San Jose, CA (US); Truman Joe, Mountain View, CA (US); Wendy R. Cartee, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/364,912

(22) Filed: Feb. 3, 2009

Related U.S. Application Data

(63) Continuation of application No. 11/744,982, filed on May 7, 2007, now Pat. No. 7,492,713, which is a continuation of application No. 10/228,132, filed on Aug. 26, 2002, now Pat. No. 7,251,215.

(51) Int. Cl.
G06F 11/00 (2006.01)
H04J 3/14 (2006.01)
H04L 1/00 (2006.01)

(52) U.S. Cl. .......................... 370/229; 370/252; 726/22

(58) Field of Classification Search .................. None
See application file for complete search history.

(56) References Cited

U.S. PATENT DOCUMENTS

| | | |
|---|---|---|
| 3,962,681 A | 6/1976 | Requa et al. |
| 4,032,899 A | 6/1977 | Jenny et al. |
| 4,600,319 A | 7/1986 | Everett, Jr. |
| 5,375,216 A | 12/1994 | Moyer et al. |

(Continued)

FOREIGN PATENT DOCUMENTS

WO    WO 98/36532 A1    8/1998

(Continued)

OTHER PUBLICATIONS

PCI Technology Overview, Feb. 2003, www.cs.unc.edu/Research/stc/FAQs/pci-overview.pdf, 22 pgs.

(Continued)

*Primary Examiner*—Michael J Moore, Jr.
*Assistant Examiner*—Marcus R Smith
(74) *Attorney, Agent, or Firm*—Shumaker & Sieffert, P.A.

(57) ABSTRACT

A network router includes a set of interface cards to receive packets from a network, and a set of accounting modules to calculate flow statistics for the packets. The router further includes a control unit to adaptively update routing information in response to the calculated flow statistics, and to route the packets in accordance with the routing information. The control unit identifies potentially malicious packet flows for the received packets based on the flow statistics, and applies an intercept filter to intercept the packets of the identified packet flows. The control unit analyzes the intercepted packets in real-time to determine the presence of a network event, and updates the routing information based on the determination, e.g., by terminating routing for packets associated with malicious packet flows. In this manner, the router may adaptively respond to network events, such as network security violations.

19 Claims, 9 Drawing Sheets

U.S. PATENT DOCUMENTS

| | | | |
|---|---|---|---|
| 5,408,539 | A | 4/1995 | Finlay et al. |
| 5,490,252 | A | 2/1996 | Macera et al. |
| 5,509,123 | A | 4/1996 | Dobbins et al. |
| 5,530,958 | A | 6/1996 | Agarwal et al. |
| 5,568,471 | A | 10/1996 | Hershey et al. |
| 6,011,795 | A | 1/2000 | Varghese et al. |
| 6,018,765 | A | 1/2000 | Durana et al. |
| 6,148,335 | A | 11/2000 | Haggard et al. |
| 6,182,146 | B1 | 1/2001 | Graham-Cumming, Jr. |
| 6,321,338 | B1 | 11/2001 | Porras et al. |
| 6,392,996 | B1 | 5/2002 | Hjalmtysson |
| 6,499,088 | B1 | 12/2002 | Wexler et al. |
| 6,501,752 | B1 | 12/2002 | Kung et al. |
| 6,563,796 | B1 | 5/2003 | Saito |
| 6,584,548 | B1 | 6/2003 | Bourne et al. |
| 6,590,898 | B1 | 7/2003 | Uzun |
| 6,594,268 | B1 | 7/2003 | Aukia et al. |
| 6,598,034 | B1 | 7/2003 | Kloth |
| 6,651,098 | B1 | 11/2003 | Carroll et al. |
| 6,735,201 | B1 | 5/2004 | Mahajan et al. |
| 6,751,663 | B1 | 6/2004 | Farrell et al. |
| 6,826,713 | B1 | 11/2004 | Beesley et al. |
| 6,870,817 | B2 | 3/2005 | Dolinar et al. |
| 6,889,181 | B2 | 5/2005 | Kerr et al. |
| 6,970,943 | B1 | 11/2005 | Subramanian et al. |
| 6,975,628 | B2 | 12/2005 | Johnson et al. |
| 6,983,294 | B2 | 1/2006 | Jones et al. |
| 6,985,956 | B2 | 1/2006 | Luke et al. |
| 7,031,304 | B1 | 4/2006 | Arberg et al. |
| 7,055,174 | B1 | 5/2006 | Cope et al. |
| 7,058,974 | B1 | 6/2006 | Maher, III et al. |
| 7,114,008 | B2 | 9/2006 | Jungck et al. |
| 7,120,931 | B1 | 10/2006 | Cheriton |
| 7,185,368 | B2 | 2/2007 | Copeland, III |
| 7,203,740 | B1 | 4/2007 | Putzolu et al. |
| 7,231,459 | B2 | 6/2007 | Saraph |
| 7,251,215 | B1 | 7/2007 | Turner et al. |
| 7,292,573 | B2 | 11/2007 | LaVigne et al. |
| 7,362,763 | B2 | 4/2008 | Wybenga et al. |
| 7,369,557 | B1 | 5/2008 | Sinha |
| 7,386,108 | B1 | 6/2008 | Zave et al. |
| 7,433,966 | B2 | 10/2008 | Charny et al. |
| 7,492,713 | B1 | 2/2009 | Turner et al. |
| 7,496,955 | B2 | 2/2009 | Akuni et al. |
| 7,561,569 | B2 | 7/2009 | Thiede |
| 7,580,356 | B1 | 8/2009 | Mishra et al. |
| 2002/0095492 | A1* | 7/2002 | Kaashoek et al. ........... 709/224 |
| 2002/0126621 | A1 | 9/2002 | Johnson et al. |
| 2002/0141343 | A1 | 10/2002 | Bays |
| 2002/0163932 | A1 | 11/2002 | Fischer et al. |
| 2003/0005145 | A1 | 1/2003 | Bullard |
| 2003/0120769 | A1 | 6/2003 | McCollom et al. |
| 2003/0145232 | A1* | 7/2003 | Poletto et al. ............... 713/201 |
| 2003/0214913 | A1 | 11/2003 | Kan et al. |
| 2007/0016702 | A1 | 1/2007 | Pione et al. |
| 2007/0058558 | A1 | 3/2007 | Cheung et al. |
| 2007/0076658 | A1 | 4/2007 | Park et al. |
| 2007/0121812 | A1 | 5/2007 | Strange et al. |

FOREIGN PATENT DOCUMENTS

| | | |
|---|---|---|
| WO | WO 02/84920 A2 | 10/2002 |

OTHER PUBLICATIONS

Juniper Networks, Inc., "Combating Bots and Mitigating DDoS Attacks", Juniper Networks, Inc., 2008, entire document, http://www.juniper.net/solutions/literature/solutionbriefs/351198.pdf.

"The CAIDA Web Site," www.caida.org, Copyright 2002.

"About Endace," www.endace.com, Copyright 2002.

"Cisco IOS NetFlow," www.cisco.com/warp/public/732/Tech/nmp/netflow/index.shtml, Copyright 2002.

U.S. Appl. No. 10/188,567, entitled "Adaptive Network Flow Analysis", filed Jul. 2, 2002, Scott Mackie.

U.S. Appl. No. 10/916,021, entitled "Stateful Firewall Protection for Control Plane Traffic Within a Network Device", filed Aug. 11, 2004. Krohn et al.

U.S. Appl. No. 10/228,114, entitled "Network Router Having Integrated Flow Accounting and Packet Interception", filed Aug. 26, 2002, Woo et al.

U.S. Appl. No. 10/241,785, entitled "Rate-Controlled Transmission of Traffic Flow Information", filed Sep. 10, 2002, Sandeep Jain.

U.S. Appl. No. 10/228,150, entitled "Network Device Having Accounting Service Card," filed Aug. 22, 2002, Woo, Hsien-Chung.

"Well-Known TCP Port Number," www.webopedia.com, 2004, 3 pages.

"TCP Packet Field Descriptions," www.ipanalyser.co.uk, Analyser Sales Ltd., Copyright 2003, 2 pages.

Michael Egan, "Decomposition of a TCP Packet," www.passwall.com, 3 pages, Aug. 7, 2000.

Mark Gibbs, "A Guide to Original SYN," www.nwfusion.com, Network World, Nov. 2000, 4 pages.

"Sample TCP/IP Packet," www.passwall.com, Version 0.0.0 @ 03:55/08.07.2000, Copyright 2002, 6 pages.

D.J. Bernstein, "SYN Cookies," http://cr.yp.to/syncookies.html, Oct. 2003, 3 pages.

Jonathan Lemon, "Resisting SYN Flood DoS Attacks with a SYN Cache," http://people.freebsd.org/~jlemon/papers/syncache.pdf, 9 pages, Nov. 14, 2001.

Stuart Staniford, et al., "Practical Automated Detection of Stealthy Portscans," http://downloads.securityfocus.com/library/spice-ccs2000.pdf, 16 pages, Copyright 2002.

Weaver, A.C. et al., "A Real-Time Monitor for Token Ring Networks," Military Communications Conference, 1989. MILCOM '89, Oct. 1989, vol. 3, pp. 794-798.

Dini, P. et al., "Performance Evaluation for Distributed System Components," Proceedings of IEEE Second International Workshop on Systems Management, Jun. 1996, pp. 20-29.

Integrated Services Adapter, 2000, Cisco Systems, Data Sheet, pp. 1-6, http://www.cisco.com/warp/public/cc/pd/ifaa/svaa/iasvaa/prodlit/ism2_ds.pdf.

Office Action from U.S. Appl. No. 11/516,878, dated Apr. 16, 2010, 39 pp.

Response to Office Action dated Apr. 20, 2010, from U.S. Appl. No. 11/516,878, filed May 24, 2010, 13 pp.

Notice of Allowance from U.S. Appl. No. 11/516,878, mailed Jun. 14, 2010, 8 pp.

\* cited by examiner

ADAPTIVE NETWORK ROUTER

This application is a continuation of U.S. application Ser. No. 11/744,982, filed May 7, 2007, which is a continuation of U.S. application Ser. No. 10/228,132, filed Aug. 26, 2002, now U.S. Pat. No. 7,251,215, the entire contents of each of which is incorporated herein by reference.

TECHNICAL FIELD

The invention relates to computer networks and, more particularly, to routing packets within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The packets are communicated according to a communication protocol that defines the format of the packet. A typical packet, for example, includes a header carrying source and destination information, as well as a payload that carries the actual data. The de facto standard for communication in conventional packet-based networks, including the Internet, is the Internet Protocol (IP).

A system administrator or other user often makes use of a network analyzer to monitor network traffic and debug network problems. In general, a network analyzer is a tool that captures data from a network and presents the data to the user. The network analyzer typically allows the user to browse the captured data, and view summary and detail information for each packet. Accordingly, the user can view the network traffic flowing between devices on the network. The information collected during traffic flow analysis may be used for network planning, traffic engineering, network monitoring, usage-based billing and the like. Many conventional network analyzers, such as NetFlow, NeTraMet and FlowScan, use software applications to collect traffic flow information.

The analyzers typically monitor and collect packets having routing information that matches criteria specified by the system administrator. The system administrator may specify, for example, source and destination Internet Protocol (IP) addresses, source and destination port numbers, protocol type, type of service (ToS) and input interface information. The analyzers typically collect packets matching the specified criteria, and construct flow analysis diagrams. Conventional network analyzers often make use of sampling techniques to selectively sample the packets, and present a statistically generated view of the traffic within the network. Consequently, the statistics generated by the network analyzer may not only be limited to specified flows, but may be relatively inaccurate.

SUMMARY

In general, the invention is directed to techniques for monitoring and analyzing traffic flows within a network. A network router, in accordance with the principles of the invention, integrates accounting functionality for generation of flow statistics with packet intercept functionality to dynamically adapt to network events, such as network security violations.

In one embodiment, a method comprises distributing packets to a set of analysis service cards of a router for real-time traffic analysis, and updating routing information of the router in response to the traffic analysis. The method further comprises routing the packets in accordance with the routing information.

In another embodiment, a network router includes a set of interface cards to receive packets from a network, and a set of accounting modules to calculate flow statistics for the packets. The router further includes a control unit to update routing information in response to the calculated flow statistics, and to route the packets in accordance with the routing information. The control unit identifies potentially malicious packet flows for the received packets based on the flow statistics, and applies one or more intercept filters to intercept the packets of the identified packet flows. The control unit analyzes the intercepted packets in real-time to determine the presence of a network event, and updates the routing information based on the determination, e.g., by terminating routing for packets associated with malicious packet flows.

In another embodiment, a method comprises receiving packets from a network, and calculating flow statistics for the packets. The method further includes updating routing information in response to the calculated flow statistics, and routing the packets in accordance with the routing information.

In another embodiment, a network router comprises a set of interface cards to receive packets from a network, and a set of accounting service cards to calculate flow statistics for the packets. The router further comprises a control unit intercept a subset of the packets based on the flow statistics, and a set of packet analysis cards to perform real-time analysis on the intercepted packets.

The techniques may provide one or more advantages. For example, flow analysis and packet intercept features may be readily integrated within a router for a packet-based network. The router may, for example, operate as a core router within the Internet to route packets received from high data rate communication links, such as OC-3, OC-12, OC-48, and greater communication links. The router may integrate accounting functionality to generate flow records for routed packets, as well as intercept features to capture packets for select packet flows. In this manner, the router can adjust routing functions based on the generated flow records and intercepted packets, thereby dynamically reacting to network events, such as Denial of Service (DOS) attacks and other network security violations.

In addition, multiple accounting service cards and multiple packet analysis cards may be added to easily scale the network router to support monitoring and accounting for higher bandwidth communication links. Depending upon processing power, two accounting service cards may be used to provide accounting for a single OC-3 communication link, while four cards and sixteen cards may be used to monitor OC-12 and OC-48 links, respectively. As another example, eight accounting service cards may be used to monitor four OC-3 links. Additional accounting service cards may be used for purposes of redundancy to support continuous, uninterrupted packet processing and accounting in the event of card failure.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
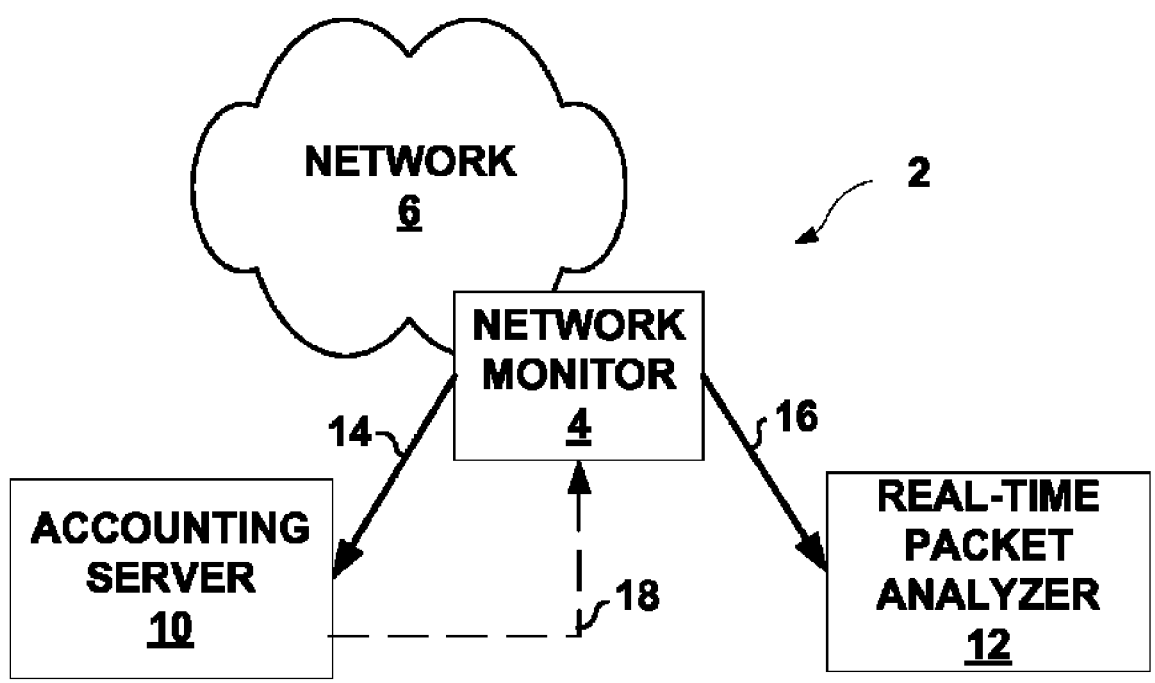
FIG. 1 illustrates an exemplary system in which a network monitor integrates accounting functionality for generation of flow records along with packet intercept functionality to provide a comprehensive traffic analysis environment in accordance with the principles of the invention.

FIG. 1 illustrates an exemplary system 2 in which a network monitor 4 integrates accounting functionality for generation of flow records with packet intercept functionality to provide a comprehensive traffic analysis environment in accordance with the principles of the invention. Network monitor 4 is coupled to network 6 for monitoring network traffic. Network 6 may be formed by an interconnected group of autonomous systems, each representing an independent administrative domain having a variety of networked resources capable of packet-based communication. For example, network 6 may include servers, workstations, network printers and fax machines, gateways, routers, and the like. Each autonomous system within network 6 typically includes at least one router for sharing routing information with, and forwarding packets to, the other autonomous systems via communication links.

The term "packet" is used herein to generally describe a unit of data communicated between resources in conformance with a communication protocol. The principles of the invention may be readily applied to a variety of protocols, such as the Transmission Control Protocol (TCP), the User Datagram Protocol (UDP), the Internet Protocol (IP), Asynchronous Transfer Mode, Frame Relay, and the like. Accordingly, "packet" is used to encompass any such unit of data, and may be interchanged with the term "cell," or other similar terms used in such protocols to describe a unit of data communicated between resources within the network.

As described, network monitor 4 includes one or more accounting modules that generate accurate flow statistics for traffic within network 6. More specifically, network monitor 4 captures packets from one or more links within network 6, and can generate flow statistics for each packet flow within the link. As network monitor 4 receives packets, the accounting modules associate the network packets with respective packet flows, and update the statistics for the packets flows. For example, the accounting modules may maintain an accurate packet count, byte count, source IP address, destination IP address, next hop IP address, input interface information, output interface information, total octets sent, flow start time, flow end time, source and destination port numbers, TCP flags, IP type of service, originating AS, source address prefix mask bits, destination address prefix mask bits, and the like, for each packet flow.

The accounting modules provide real-time accounting capabilities for maintaining accurate flow statistics for all of the packets received by network monitor 4. In particular, as described herein, the accounting modules can monitor and generate statistics for high traffic rates, even core traffic rates of the Internet, including OC-3, OC-12, OC-48, and higher rates.

Network monitor 4 outputs a stream of flow records 14 that carry flow statistics for the captured packets. Network monitor 4 may, for example, output flow records 14 carrying accounting data for each flow, such as a number of packets, a number of bytes, a time of capturing a first packet for the flow, a time of capturing a most recent packet for the flow, an incoming interface, an outgoing interface, a source/destination network mask, a source/destination Autonomous System (AS) number, and the like. Accounting server 10 receives flow records 14, and updates an accounting system based on the flow records for further detailed analysis.

In addition, network monitor 4 provides intercept capabilities that allow a real-time packet analyzer 12 to monitor specific packet flows within network 4. Network monitor 4 outputs a stream of packets 16 to real-time packet analyzer 12 for further analysis. The stream of packets 16 comprises a subset of the packets captured from network 6. In particular, network monitor 4 intercepts packets for one or more selected packet flows within network 4, and outputs the intercepted packets as a stream of packets 16. Packet analyzer 12 receives the stream of packets 16, and analyzes the packets to identify any suspicious packet flows. For example, packet analyzer 12 may identify packet flows arising from Denial of Service (DOS) attacks and other network security violations.

A system administrator may provide intercept information to network monitor 4 that specifies a set of packet flows for which to capture packets. The system administrator may provide the intercept information directly, e.g., via a keyboard, mouse or other input mechanism, to control interception of packet flows. In addition, an administrator may remotely provide the routing information to network monitor 4 via a remote management protocol. In this manner, the administrator may selectively define the packet flows, and packets within a given flow, that are intercepted for analysis.

Network monitor 4 may also control the stream of intercepted packets 16 based on feedback from accounting server 10. More specifically, accounting server 10 may perform preliminary traffic analysis based on the flow records 14 received from network monitor 4, and provides filter information 18 to the network monitor to control the interception and forwarding of packets flows to packet analyzer 12 for further analysis. In this manner, network monitor 4 integrates accounting functionality for generation of flow records 14 along with packet intercept functionality to provide a comprehensive traffic analysis environment.

Although illustrated as a stand-alone apparatus, the features of network monitor 4 may be integrated within a network device. For example, as described in detail below, the feature may be integrated within a router. Other network devices in which the features may be integrated include gateways, switches, servers, workstations, and the like.

Figure 2:
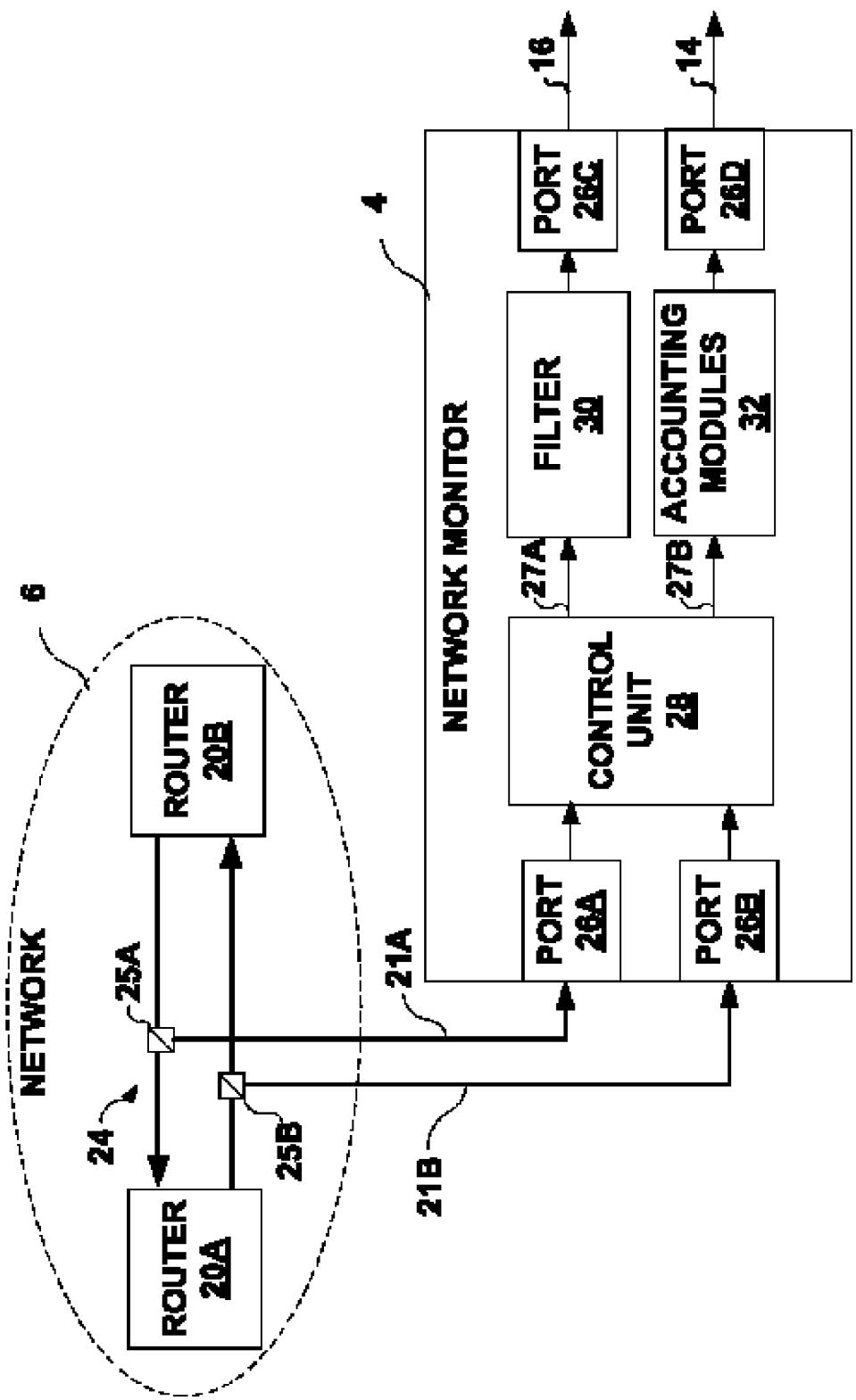
FIG. 2 is a block diagram illustrating an example embodiment of a network monitor consistent with the principles of the invention.

FIG. 2 is a block diagram illustrating in further detail an example embodiment of network monitor 4 coupled to communication links 24 of network 6. As illustrated, network 6 includes routers 20A, 20B ("routers 20") coupled via communication links 24. Routers 20 may comprise conventional routers that forward packets in accordance with a topology of network 6. Communication links 24 may comprise uni-directional optical links for carrying packets between routers 20 at high data rates, such as OC-3, OC-12, OC-48 and greater rates. Optical splitters 25A, 25B ("optical splitters 25") may be inserted within communication links 24 to passively collect optical data transmitted and received between routers 20.

Network monitor 4 includes two ports 26A, 26B for receiving the optical data 21A, 21B, respectively, and forwarding the data in digital form to control unit 28. As discussed in detail, control unit 28 merges the inbound data 21A, 21B received from ports 26A, 26B, and digitally generates two identical packets streams 27A, 27B from the data. Control unit 28 applies filter 30 to packet stream 27A to selectively capture packet flows 16 for forwarding to packet analyzer 12 via output port 26C. In addition, control unit 28 distributes packets of the second stream 27B to accounting modules 32. Accounting modules 32 generate flow records 14 based on all of the packets of data stream 27B, i.e., all of the packets received from optical splitters 25, and forward flow records 14 to accounting server 10 via output port 26D.

Accounting modules 32 may buffer flow records 14 for a given packet flow until the flow "expires," i.e., when the accounting modules 32 detect inactivity for the flow for a configurable period of time, e.g., 30 minutes. Accounting modules 32 may periodically output batches of flow records 14 for all flows that have recently expired, e.g., every fifteen, thirty or sixty seconds. For packet flows that remain active for long durations, accounting modules 32 may be configured to automatically expire the packet flows after a defined duration, e.g., 30 or 60 minutes. Upon marking the active packet flow as expired, accounting modules 32 may output one or more flow records 14 for the packet flow, and may reset the statistics for the packet flow. Alternatively, accounting modules may output flow records 114 without resetting the statistics for the active packet flow.

Figure 3:
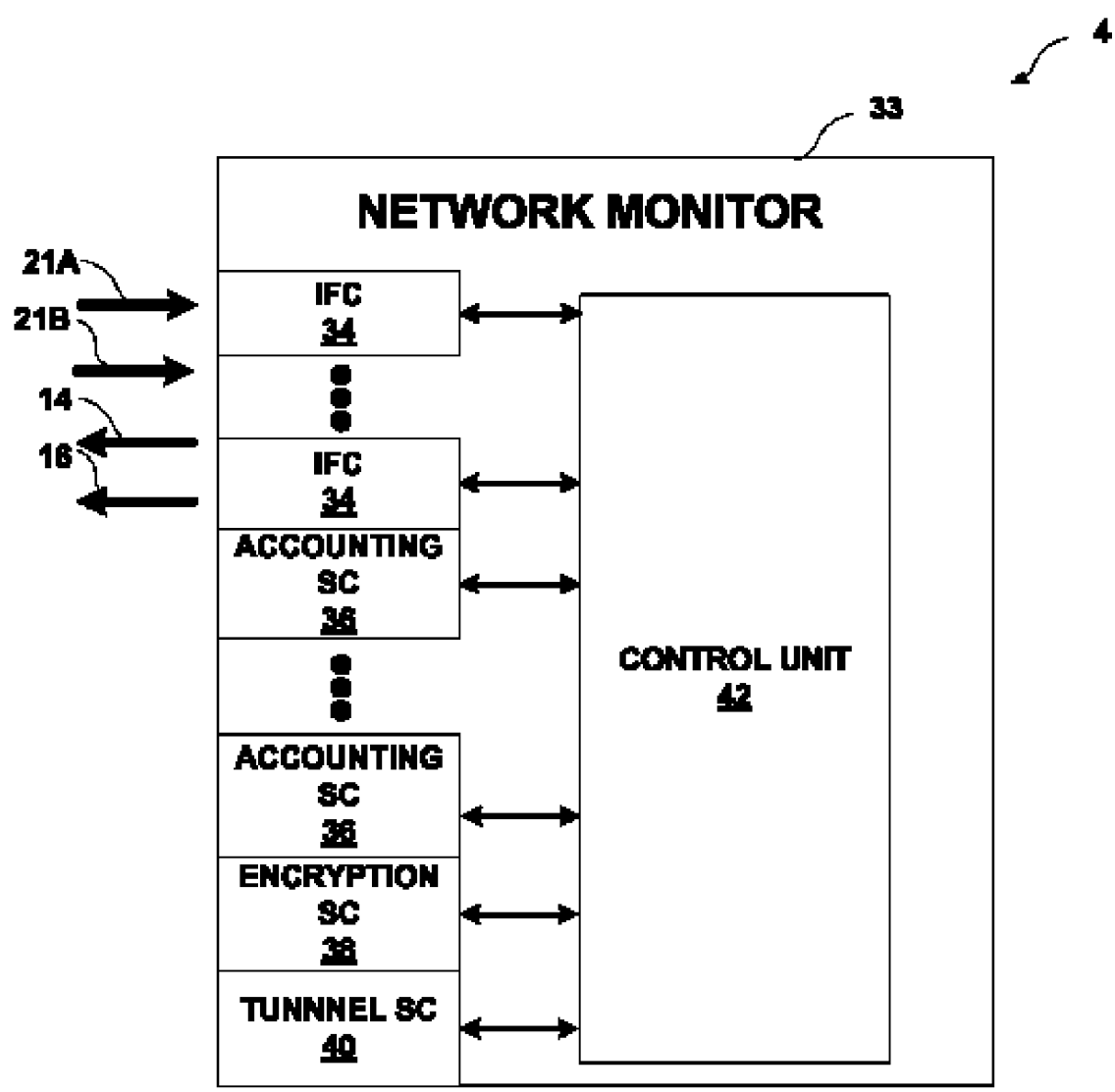
FIG. 3 is a block diagram illustrating another exemplary embodiment of a network monitor in further detail.

FIG. 3 is a block diagram illustrating another exemplary embodiment of a network monitor 4. In the illustrated embodiment, network monitor 4 includes a chassis 33 for housing control unit 42. Chassis 33 has a number of slots (not shown) for receiving a set of cards, including interface cards (IFCs) 34, accounting service cards (ACCOUNTING SCs) 36, an encryption service card (ENCRYPTION SC) 38, and a tunnel service card (TUNNEL SC) 40. Each card may be inserted into a corresponding slot of chassis 33 for electrically coupling the card to control unit 42 via a bus, backplane, or other electrical communication mechanism.

Interface cards 34 include ports for receiving inbound data 21 from optical splitters 25, and for outputting flow records 14 and intercepted packet flows 16. Accordingly, interface cards 34 include a number of ports (not shown) for coupling with communication links.

Accounting service cards 36 each include one or more accounting modules that generate flow records based on packets received from control unit 42. Each accounting service card 36 may, for example, include one or more microprocessors, FPGAs, ASICs, or other components. As described, control unit 42 distributes packets to accounting service cards 36 for accounting and generation of flow records 14. In one embodiment, control unit 42 distributes the packets of a common flow to a common accounting service card 36. In other words, control unit 42 distributes packet flows across accounting service cards 36, and ensures that packets of any particular flow are distributed to a common one of accounting service cards 36. In this manner, each of accounting service cards can generate complete flow records for the packet flows for which the card receives packets.

In one embodiment, control unit 42 applies a hashing function to at least a portion of the header for each packet to ensure that packet flows are distributed across accounting service cards 36, and that packets of a packet flow are distributed to a common one of the accounting service cards 36. Control unit 42 may apply a hashing function to at least one of a source network address, a destination network address, and a communication protocol for the packet. Control unit 42 may apply the hash function to header information with each packet to generate a hash value, and distribute each packet to one of the accounting service cards 36 based on the calculated hash values. Furthermore, portions of the header information may be selected to cause packet fragments associated with a common one of the network packet to be distributed to a common one of the accounting service cards. For example, layer 4 port information may be ignored, which may not be present for packet fragments.

Multiple accounting service cards 36 may be added to easily scale network monitor 4 to support monitoring and accounting for higher bandwidth communication links. For example, depending upon processing power, two accounting service cards 36 may be used to provide accounting for a single OC-3 communication link, while four cards and sixteen cards may be used to monitor OC-12 and OC-48 links, respectively. As another example, eight accounting service cards 36 may be used to monitor four OC-3 links. Additional accounting service cards 36 may be used for purposes of redundancy to support continuous, uninterrupted packet processing and accounting in the event of card failure.

As described with respect to accounting modules 32 (FIG. 2), accounting service cards 36 may output the flow records 14 for a given packet flow when the flow "expires," i.e., when the accounting service cards 36 detect inactivity for the flows for a configurable period. For example, accounting service cards 36 may make use of inactivity timers to determine when to output flow records. For packet flows that remain active for long durations, accounting service cards 36 may be configured to automatically expire the packet flows after a defined duration, e.g., 30 or 60 minutes.

If accounting server 10 and packet analyzer 12 are co-located with network monitor 4, control unit 42 may direct the flow records and intercepted packets directly to an appropriate output port of interface cards 34. In environments where accounting server 10 and packet analyzer 12 are located at remote destinations from network monitor 4, control unit 42 may make use of encryption service card 38 and tunnel service card 40 to preserve security.

Encryption service card 38 provides cryptographic functionality to network monitor 4. In particular, control unit 42 may forward flow records generated by accounting service cards 36 to encryption service card 38 prior to forwarding to accounting server 10. In addition, control unit 42 may forward the intercepted packets for the select packet flows to encryption service card 38 for encryption prior to forwarding to packet analyzer 12.

Network monitor 4 may also include a network tunneling mechanism for relaying the flow records and intercepted packets through tunnels. Encryption service card 38 may provide IPSec tunnel, while tunnel service card 40 may provide GRE and IPIP tunnels. Tunnel service card 40 aggregates traffic received from interface cards 34, and returns the traffic back to control unit 42 for output via interface cards 34. Control unit 42 may apply filter-based forwarding (FBF) to direct the returned traffic to the appropriate output port of IFCs 34.

Figure 4:
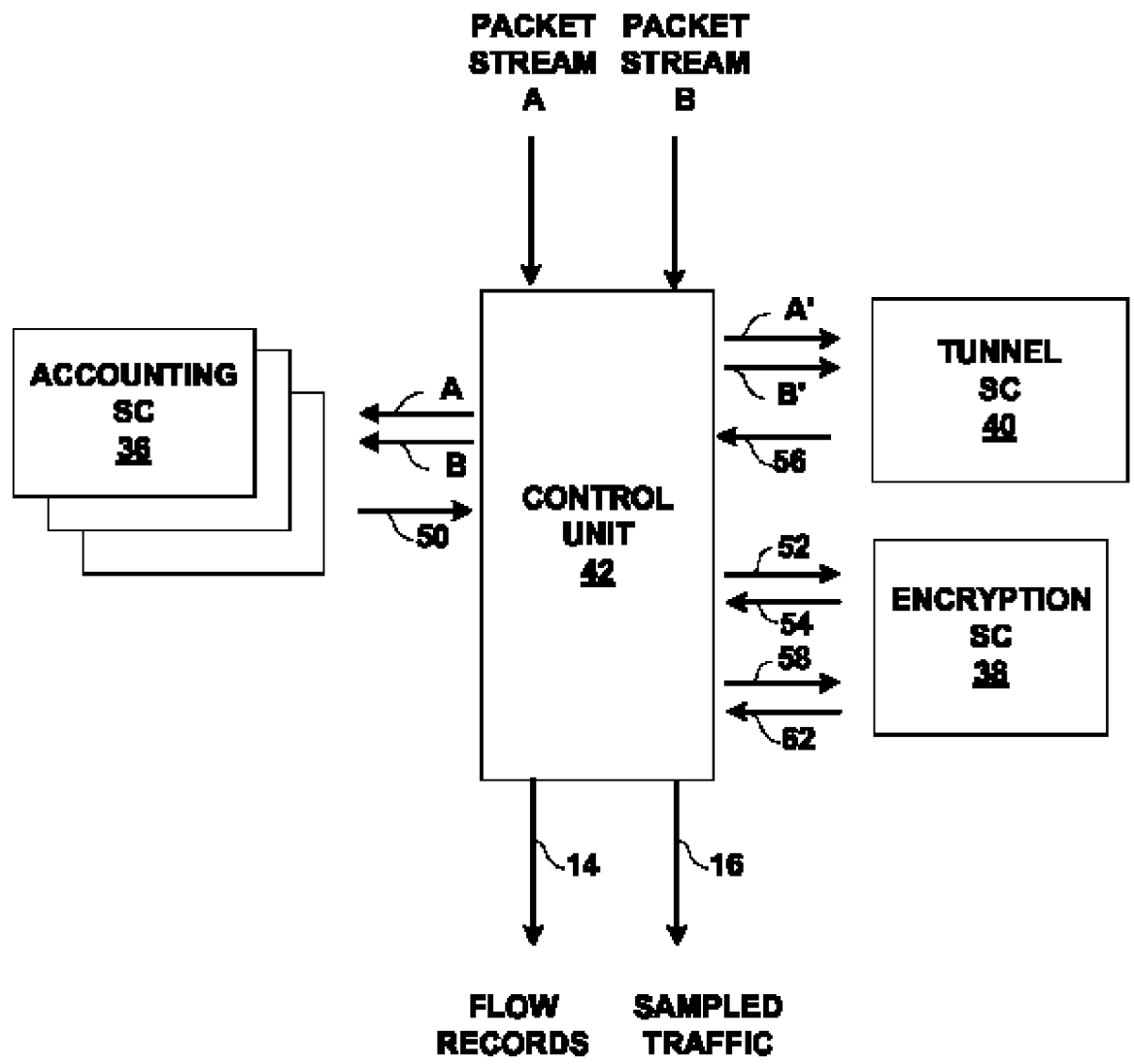
FIG. 4 is a block diagram illustrating the flow of packets through the various components of a network monitor in accordance with the principles of the invention.

FIG. 4 is a block diagram illustrating the flow of packets through the various components of a network monitor 50 in accordance with the principles of the invention. In the illustrated example, network monitor 50 monitors multiple communications links. In particular, network monitor 50 collects transmit and receive packets for a first communication link (labeled packet stream A in FIG. 1), and a second communication link (packet stream B). The first communication link may, for example, comprise an OC-12 link, and the second communication link may comprise an OC-48 link.

Initially, control unit 42 receives packets streams A, B via separate monitoring ports (not shown). As described above, optical splitters may be used to passively collect packet streams A, B from the respective communication links. Control unit 42 distributes packet stream A, B to accounting service cards 36 for generation of a stream of packets 50 carrying flow records. More specifically, accounting service cards 36 collect information from the packet flows within packet streams A, B and, based on the information, output packets 50 carrying flow records to control unit 42.

If encryption is enabled, control unit 42 forwards packet stream 50 as packet stream 52 to carry the flow records to encryption card 38 for encryption. Encryption card 38 encrypts each incoming packet 52, and returns a stream of encrypted packets 54 to control unit 42. Control unit 42 forwards the encrypted packets carrying flow records 14 to accounting server 10 via an output port of one or more of interface cards 34.

Simultaneous with the above-described accounting process, control unit 42 mirrors and filters each of the incoming packets of incoming packet streams A, B to produce packet streams A', B'. Control unit 42 may, for example, buffer incoming packets for packet streams A, B, and digitally copy each buffered packet to internally mirror packets streams A, B. Control unit 42 applies a filtering operation to the mirrored packet streams to produce packet streams A', B' having intercepted packets for select packet flows. Consequently, packet streams A', B' carry copies of a subset of the packets within incoming packet streams A, B, respectively.

Control unit 42 forwards packet streams A', B' to tunnel service card 40 for aggregation and loopback to control unit 42 as aggregated packet stream 56. Finally, control unit 42 applies filter-based forwarding (FBF) to forward aggregated packet stream 56 to packet analyzer 12 as output packet stream 16. More specifically, control unit 42 directs aggregated packet stream 56 to an appropriate output interface card as packet stream 16 for forwarding to packet analyzer 12. If encryption is enabled, control unit may forward aggregated packet stream 56 to encryption service card 38 as packet stream 58, and may receive encrypted packet stream 62 in return for forwarding to packet analyzer 12 as packet stream 16.

Figure 5:
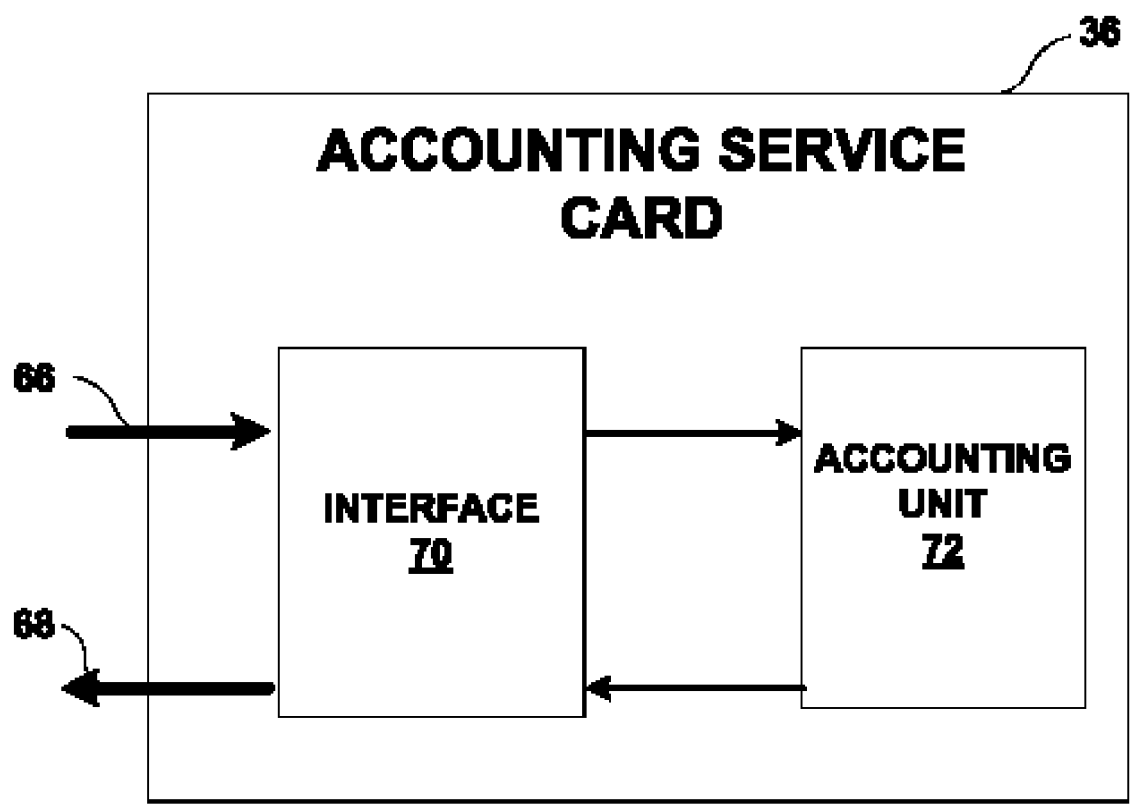
FIG. 5 is a block diagram illustrating an example embodiment of an accounting service card in accordance with the principles of the invention.

FIG. 5 is a block diagram illustrating an example embodiment of an accounting service card 36 in accordance with the principles of the invention. Accounting service card 36 receives inbound packet stream 66 via interface 70. Interface 70 may, for example, comprise a high-speed communication bus, back plane, switch fabric, or the like, to allow accounting service card 36 to easily be inserted and removed from an interface slot within the chassis of network monitor 33. In this fashion, interface 70 allows multiple accounting service cards 36 to be added to network monitor chassis 33 to support monitoring of high data rate communication links.

Interface 70 forwards packet stream 66 to accounting unit 72 for updating flow statistics. Interface 70 may forward each packet in its entirety, or may extract only those portions of the packets necessary for maintaining accurate flow statistics. Interface 70 may, for example, extract header information and forward the extracted header information to accounting unit 72. In this manner, bandwidth efficiencies may be achieved between interface 70 and accounting unit 72. The extracted header information may include information necessary for determining a particular packet flow for each packet, such as a source network address, a destination network address, a protocol, a source port number, and a destination port number, as well as information for generating flow statistics, such as a byte count for each packet.

Based on the received packets, accounting unit 72 updates flow statistics, and output packets 68 carrying flow records. Accounting unit 72 may comprise one or more microprocessors, FPGAs, ASICs, combinations thereof, and the like. As described above, accounting service cards 36 may output the flow records for a given packet flow when the flow "expires," i.e., when the accounting service cards 36 detect inactivity for the flows for a configurable period. For example, accounting service cards 36 may make use of inactivity timers to determine when to output flow records. For packet flows that remain active for long durations, accounting service cards 36 may be configured to automatically expire the packet flows after a defined duration, e.g., 30 or 60 minutes. Interface 70 forwards packets 68 carrying flow records to control unit 42.

Figure 6:
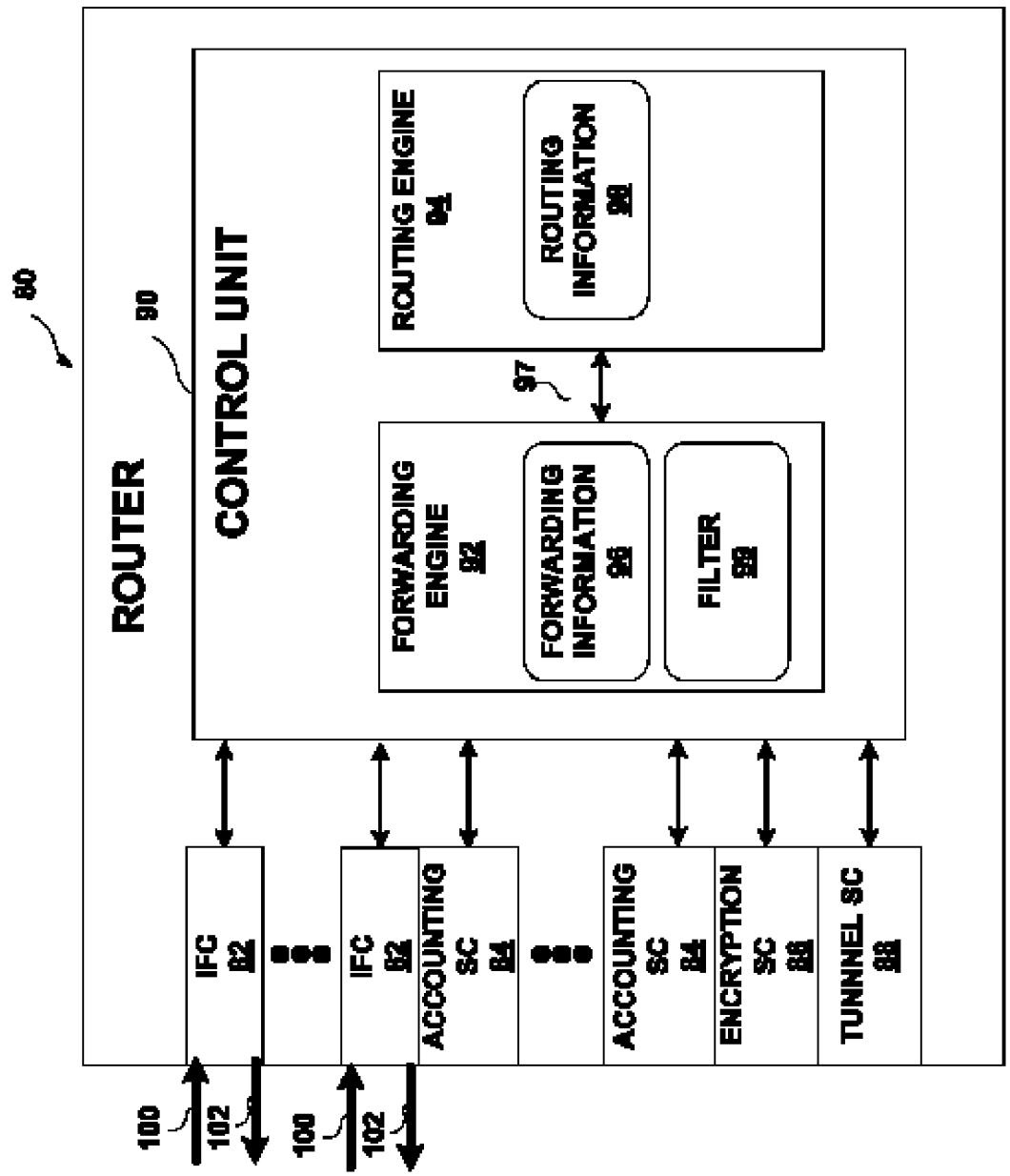
FIG. 6 is a block diagram illustrating an example embodiment of a router that incorporates accounting and intercept functionality.

FIG. 6 is a block diagram illustrating an example embodiment of a router 80 that incorporates accounting and intercept functionality consistent with the principles of the invention. Router 80 implements routing functionality to operate as a router within a packet-based network. Router 80 may, for example, operate as a core router within the Internet to route packets received from high data rate communication links, such as OC-3, OC-12, OC-48, and greater communication links. In addition, router 80 integrates accounting functionality to generate flow records for routed packets. Furthermore, router 80 integrates intercept features to capture packets for select packet flows. As described, router 80 can adjust routing functions based on the generated flow records and intercepted packets, thereby dynamically react to network events, such as Denial of Service (DOS) attacks and other network security violations.

Router 80 includes a control unit 90 that directs inbound packets received from inbound links 100 to appropriate outbound links 102. In particular, the functionality of control unit 90 can be divided between a routing engine 94 and a packet-forwarding engine 92.

Routing engine 94 is primarily responsible for maintaining routing information 98 to reflect the current network topology. In order to maintain an accurate representation of the network, router 80 supports a number of protocols for exchanging routing information with other routers. For example, router 80 may support the Border Gateway Protocol (BGP), for exchanging routing information with routers of other autonomous systems. Similarly, router 80 may support the Intermediate System to Intermediate System protocol (IS-IS), which is an interior gateway routing protocol for communicating link-state information within an autonomous system. Other examples of interior routing protocols include the Open Shortest Path First (OSPF), and the Routing Information Protocol (RIP).

Routing engine 94 directs packet-forwarding engine 92 to maintain forwarding information 96 in accordance with routing information 98. Forwarding information 96 may, therefore, be thought of as a subset of the information contained within routing information 98. In particular, forwarding information 96 associates packet information, referred to as a "key," with specific forwarding next hops (FNH). A FNH generally refers to a neighboring router physically coupled to a source router along a given route. For example, the FNH for a route may specify a physical interface and media access control (MAC) address for the interface associated with the router.

Packet-forwarding engine 92 controls the flow of packets through router 80 as described above in order to integrate routing, accounting and intercept functionality. For example, packet-forwarding engine 92 distributes inbound packets to accounting service cards 84 for accounting and generation of flow records. In addition, packet-forwarding engine 92 mirrors inbound packets, and applies filter 99 to the mirrored packet stream to intercept select packet flows.

Similar to the packet flow described above in reference to FIG. 4, encryption service card 86 provides cryptographic functionality and, along with tunnel service card 88, may provide a network tunneling mechanism for relaying the flow records and intercepted packets through secure tunnels.

To support routing functionality, accounting service cards 84 output packetized flow records to packet forwarding engine 92, and also returns the original packets. Packet forwarding engine 92 forwards the packets out interface cards 82 in accordance with forwarding information 96.

In one embodiment, each of packet-forwarding engine 92 and routing engine 94 may comprise one or more dedicated processors, hardware, and the like, and may be communicatively coupled by data communication channel 36. Data communication channel 36 may be a high-speed network connection, bus, shared-memory or other data communication mechanism.

Figure 7:
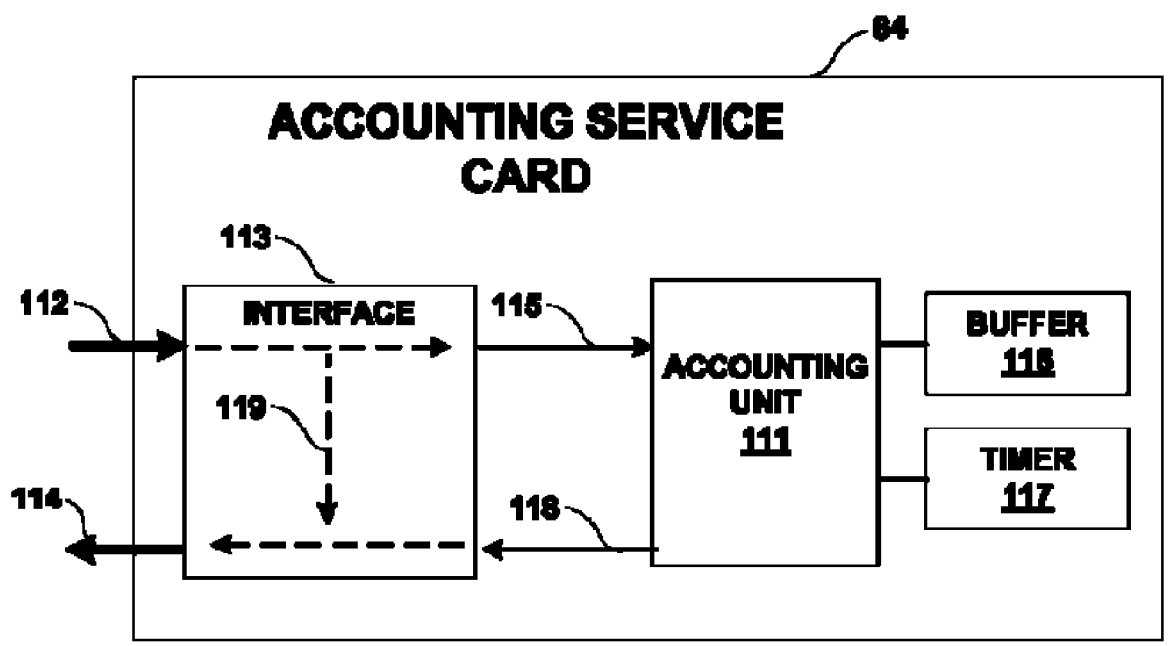
FIG. 7 is a block diagram illustrating another embodiment of an accounting service card.

FIG. 7 is a block diagram illustrating another embodiment of an accounting service card 84 in accordance with the principles of the invention. Accounting service card 84 receives inbound packet stream 112 via interface 113, which may comprise a high-speed communication bus, back plane, switch fabric, or the like. Interface 113 allows accounting service card 84 to easily be inserted and removed from an interface slot within the chassis of router 80. In this fashion, interface 112 allows multiple accounting service cards 84 to be added to router 80 to support monitoring of high data rate communication links.

Interface 113 extracts header information from packets 112, and forwards the extracted header information 115 to accounting unit 111 for computation of flow records 118. In addition, interface 113 redirects packets 112 to be returned to packet-forwarding engine 92 via loop-back path 119.

Based on the received header information 115, accounting unit 111 updates flow statistics, and output packets 1188 carrying flow records. Accounting unit 72 may comprise one or more microprocessors, FPGAs, ASICs, combinations thereof, and the like. Accounting unit 111 may store the flow records within buffer 116, and may output the flow records periodically in accordance with a configurable period, such as fifteen, thirty or sixty seconds, maintained by timer 117. Alternatively, accounting unit 111 may buffer the flow records until flow expire. In this configuration, accounting unit 111 allocates a corresponding timer 117 for each detected packet flow, and utilizes the timers to time periods of inactivity for each packet flow. Accounting unit 111 outputs flow records for a given packet flow upon detecting inactivity for the flow for a configurable period.

Interface 113 receives packets 118 carrying flow records, and merges packets 118 with packets 112 to form packet stream 114. Interface 113 directs packet stream 114 to packet-forwarding engine 92. In this fashion, accounting service card 80 outputs flow records 118 for a received packet stream 112, and also returns the packet stream to control unit 90 for routing. Upon receiving the returned packet stream, packet-forwarding engine 92 forwards the packets in accordance with forwarding information 96. More specifically, packet-forwarding engine 92 forwards the packets to interface cards 82 for output on communication links 102. In this manner, router 80 can function as a fully functional core routing device having integrated traffic analysis and intercept features.

Figure 8:
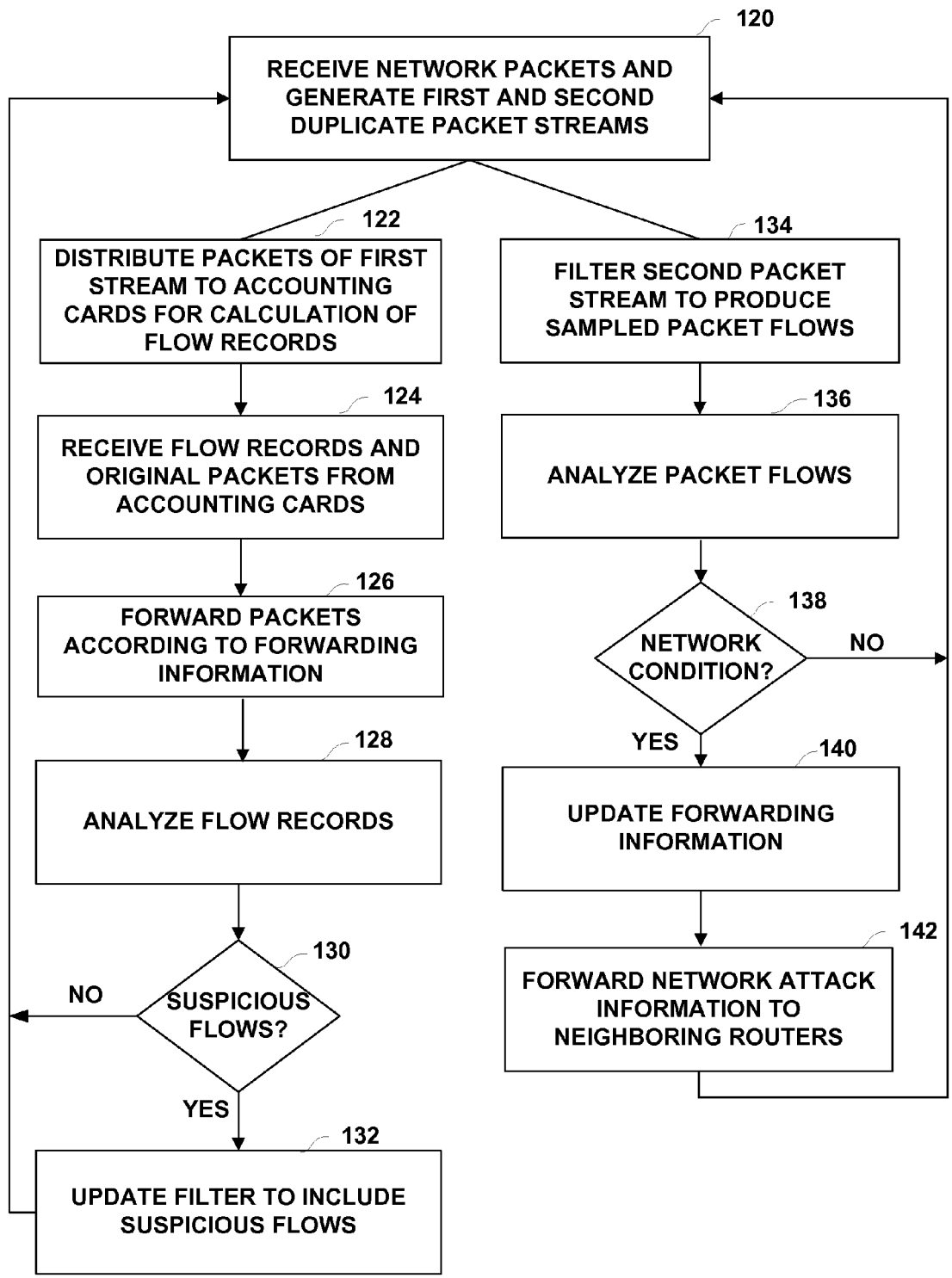
FIG. 8 is a flowchart illustrating operation of router that integrates traffic analysis and intercept features with routing functionality to dynamically react to network events, such as Denial of Service (DOS) attacks and other network security violations.

FIG. 8 is a flowchart illustrating operation of router 80 that integrates traffic analysis and intercept features with routing functionality to dynamically react to network events, such as Denial of Service (DOS) attacks and other network security violations.

Packet-forwarding engine 92 receives packets via inbound communication links 100, and mirrors each packet to produce duplicate packet streams (120). Next, packet-forwarding engine 92 distributes the packets of one stream to accounting service cards 84 for generation of flow records (122).

Packet-forwarding engine 92 receives the flow records from accounting service cards 84, as well as the original packets (124). Next, packet-forwarding engine 92 forwards the packets in accordance with forwarding information 96 (126).

In addition, control unit 90 analyzes the flow records received from accounting service cards 84 to identify any suspicious packet flows (128). For example, control unit may determine whether any packet flows have significant traffic levels that may indicate the presence of a Denial of Service attack or other network security violation. If control unit 90 identifies any suspicious flows (130), the control unit 90 modifies intercept filter 99 to enable real-time packet interception and traffic analysis for the suspicious flow (132).

Simultaneously with the above-described accounting process, control unit 90 applies filter 99 to the second of the mirrored packet streams to produce an intercepted set of packets for select packet flows (134). Control unit 90 analyzes the packet flows in real-time to determine whether a network condition exists, such as a network security violation (136). Although the analysis features have been described in reference to control unit 14, the features may readily be incorporated into one or more separate modules. For example, router 80 may comprise one or more packet analysis service cards to perform real-time analysis on the intercepted packets.

If a network condition exists that requires a response (138), control unit 90 updates forwarding information 96 (140). For example, routing engine 94 may regenerate forwarding information 96 from routing information 98 to adaptively terminate forwarding of one or more malicious packet flows. In other words, control unit 90 may dynamically update routing of packets based on flow records and real-time analysis of intercepted traffic. In this manner, router 80 integrates traffic analysis and intercept features with routing functionality to dynamically reacting to network events.

Control unit 90 may forward network condition information to other network devices, e.g., by generating a message to warn the other network devices of a network attack (142). Control unit 90 may, for example, forward specific flow information regarding terminated packet flows. Control unit 14 may forward the information in accordance with routing protocols, such as BGP, IS-IS, RIP, and the like. These messages may, for example, advertise or withdraw routes or carry other network information, such as link state information.

Figure 9:
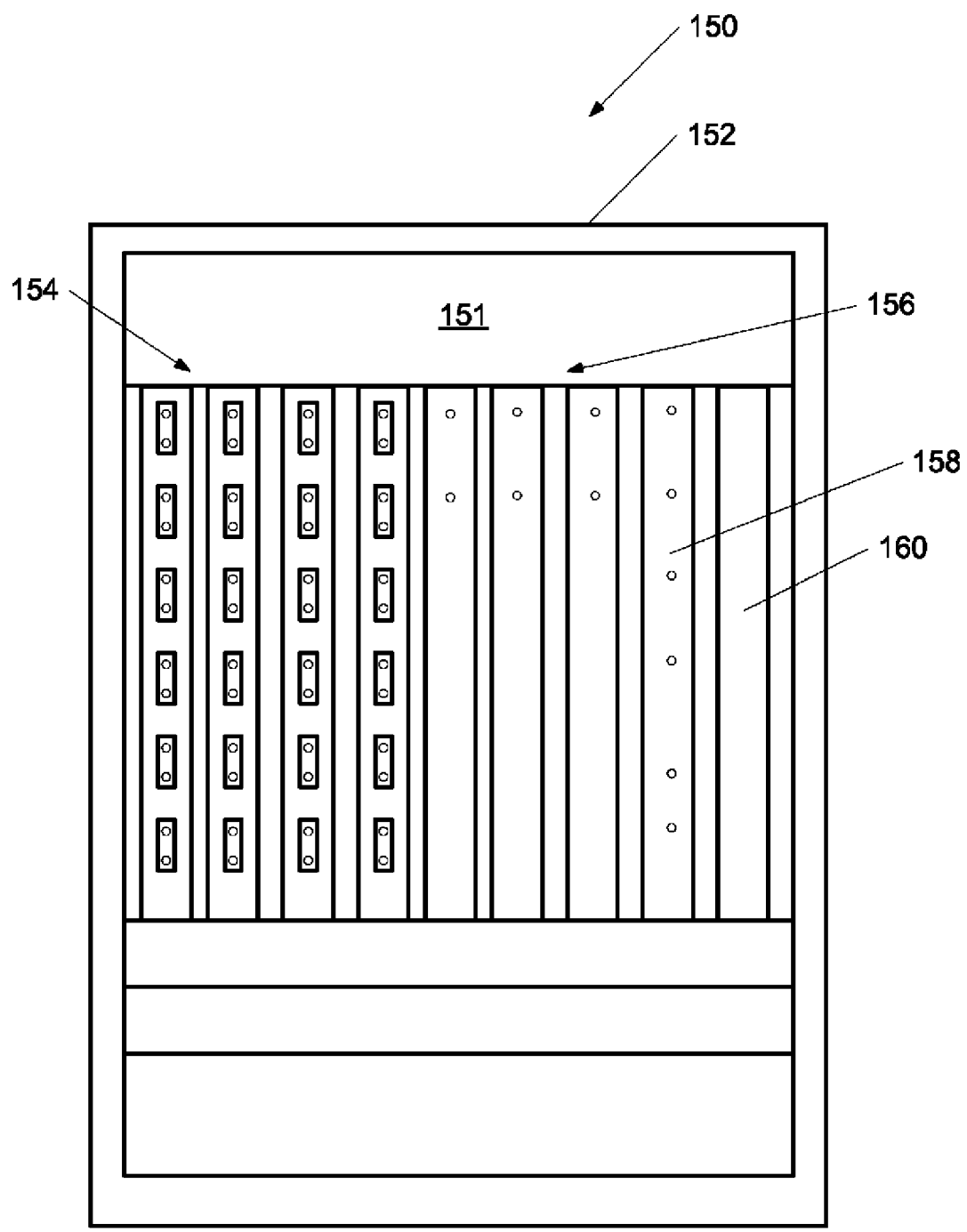
FIG. 9 is a schematic diagram illustrating an exemplary embodiment of a network router that integrates traffic analysis and intercept features with routing functionality.

For exemplary purposes, the integrated traffic analysis and intercept features of router 80 have been described with reference to accounting service cards 84, and, in particular, to the use of flow records that describe packet flow statistics. The techniques, however, may readily be applied to traffic analysis generally, and need not be based on packet flow statistics. In particular, router 80 may perform detailed analysis of traffic patterns and packet content, and may dynamically update forwarding information based on the analysis in response to the analysis. For example, accounting service cards 84 or dedicated traffic analysis cards may scan each packet received from packet-forwarding engine 92 to detect and filter any packets carrying a virus signature. Accounting service cards 84 may output to control unit 90 traffic analysis messages generally, possibly including packet flow records carrying flow statistics FIG. 9 is a schematic diagram illustrating an exemplary embodiment of a network router 150 that integrates traffic analysis and intercept features with routing functionality. In the illustrated embodiment, network router 150 includes a chassis 152 for housing control unit 151 having a routing engine and a packet forwarding engine (not shown). In the illustrated example, chassis 150 has nine slots for receiving a set of cards. In particular, chasis 150 receives four interface cards (IFCs) 154, three accounting service cards 156, an encryption service card 158, and a tunnel service card 160. Each card may be inserted into a corresponding slot of chassis 152 for electrically coupling the card to control unit 151 via a bus, backplane, or other electrical communication mechanism. Interface cards 154 include ports for coupling to communication links.

Various embodiments of the invention have been described. These and other embodiments are within the scope of the following claims.

The invention claimed is:

1. A network router comprising:
a chassis having a plurality of slots to receive removable cards;
a plurality of removable interface cards inserted within the slots to receive packets from a network;
a plurality of removable accounting service cards inserted within the slots to calculate statistics for the flows of the packets;
a set of one or more removable packet analysis cards inserted within the slots; and
a control unit to intercept a subset of the packets based on the flow statistics for which traffic levels exceed a threshold indicative of a network event,
wherein the control unit forwards the intercepted packets to the packet analysis cards,
wherein the packet analysis cards analyze contents of the intercepted packets to determine the presence of the network event;
wherein the control unit updates routing information based on the determination of the packet analysis cards and routes the packets in accordance with the routing information.

2. The network router of claim 1, wherein the network event comprises a Denial of Service (DOS) attack.

3. The network router of claim 1, wherein the control unit applies an intercept filter to intercept the packets.

4. The network router of claim 3, wherein the control unit updates the intercept filter based on the calculated flow statistics.

5. The network router of claim 1, wherein the control unit generates a message informing other devices within the network of the network event.

6. The network router of claim 1, wherein the control unit updates the routing information to terminate the routing of packets for one or more of the packet flows.

7. The network router of claim 1, wherein the control distributes the packets to the accounting modules for calculation of the flow statistics.

8. The network router of claim 7, wherein the control unit applies a hash function to each packet to calculate a hash value; and distributes each packet to one of the accounting service cards based on the calculated hash values.

9. The network router of claim 1, wherein the control unit comprises:
a routing engine to generate forwarding information in accordance with the routing information; and
a forwarding engine to forward the network packets to output ports of the interface cards in accordance with the forwarding information.

10. The network router of claim 1, wherein the traffic flow statistics comprise one or more of a packet count for each flow, a byte count for each flow, a source IP address for each flow, a destination IP address for each flow, a next hop IP address for each flow, input interface information for each flow, output interface information for each flow, total octets sent for each flow, flow start time, flow end time, source and destination port numbers for each flow, TCP flags for each flow, type of service for each flow, originating autonomous system for each flow, source address prefix mask bits for each flow, or destination address prefix mask bits for each flow.

11. A method comprising:
receiving packets from a network via an interface card of a network device;
calculating, with the network device, flow statistics for the packets;
identifying, with the network device, a set of packet flows for the received packets based on the flow statistics;
determining, with the network device, whether a traffic level for each of the packet flows of the received packets exceeds a threshold to identify a network event;
when the traffic level for one of the packet flows exceeds the threshold, intercepting the packets associated with the identified packet flows and distributing the intercepted packets to a set of analysis service cards of the network device for real-time traffic analysis;
scanning the contents of the intercepted packets via the analysis service cards to detect virus signatures;
updating routing information of the network device in response to the scanning; and
routing the packets with the network device in accordance with the routing information.

12. The method of claim 11, wherein the flow statistics comprise one or more of a packet count for each flow, a byte count for each flow, a source IP address for each flow, a destination IP address for each flow, a next hop IP address for each flow, input interface information for each flow, output interface information for each flow, total octets sent for each flow, flow start time, flow end time, source and destination port numbers for each flow, TCP flags for each flow, type of service for each flow, originating autonomous system for each flow, source address prefix mask bits for each flow, or destination address prefix mask bits for each flow.

13. The method of claim 11, wherein the network event comprises a Denial of Service (DOS) attack.

14. The method of claim 11, wherein intercepting the packets comprises applying an intercept filter to intercept the packets.

15. The method of claim 14, further comprising updating the intercept filter based on the calculated flow statistics.

16. The method of claim 11, further comprising generating a message with the network device to inform other devices within the network of the network event.

17. The method of claim 11, further comprising updating the routing information to terminate the routing of packets for one or more of the packet flows.

18. The method of claim 11, wherein calculating flow statistics comprises distributing the packets from a control unit of the network device to a plurality of accounting modules within the network device.

19. The method of claim 18, further comprising:
 applying a hash function to each packet to calculate a hash value; and
 distributing each packet from the control unit to one of the accounting service modules based on the calculated hash values.

* * * * *